(12) United States Patent
Theimer et al.

(10) Patent No.: US 8,868,766 B1
(45) Date of Patent: Oct. 21, 2014

(54) OPTIMIZING COMMUNICATION AMONG COLLECTIONS OF COMPUTING RESOURCES

(75) Inventors: Marvin M. Theimer, Bellevue, WA (US); Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 346 days.

(21) Appl. No.: 13/074,982

(22) Filed: Mar. 29, 2011

(51) Int. Cl.
*G06F 15/16* (2006.01)

(52) U.S. Cl.
USPC .......................................................... 709/229

(58) Field of Classification Search
USPC ......................................... 709/223–226, 229
See application file for complete search history.

(56) References Cited

U.S. PATENT DOCUMENTS

| | | | |
|---|---|---|---|
| 5,812,750 A * | 9/1998 | Dev et al. ...................... 714/4.12 |
| 7,185,073 B1 | 2/2007 | Gai et al. |
| 7,743,127 B2 | 6/2010 | Santos et al. |
| 8,104,069 B2 | 1/2012 | Thurm et al. |
| 8,533,724 B1 | 9/2013 | Theimer et al. |
| 2001/0023440 A1 | 9/2001 | Franklin et al. |
| 2002/0143786 A1 | 10/2002 | Ayi et al. |
| 2004/0169654 A1* | 9/2004 | Walker et al. .................. 345/440 |
| 2004/0260796 A1* | 12/2004 | Sundqvist et al. ............. 709/223 |
| 2005/0091031 A1 | 4/2005 | Powell et al. |
| 2005/0198243 A1 | 9/2005 | Snible et al. |
| 2005/0198333 A1 | 9/2005 | Dinges et al. |
| 2005/0267887 A1* | 12/2005 | Robins .............................. 707/9 |
| 2006/0085852 A1 | 4/2006 | Sima |
| 2006/0206485 A1 | 9/2006 | Rubin et al. |
| 2006/0218155 A1* | 9/2006 | Fisher et al. ................... 707/100 |
| 2007/0214497 A1 | 9/2007 | Montgomery et al. |
| 2008/0163124 A1* | 7/2008 | Bonev et al. ................... 715/853 |
| 2010/0050173 A1 | 2/2010 | Hensbergen |
| 2010/0312871 A1* | 12/2010 | Desantis et al. ............... 709/223 |
| 2011/0022711 A1* | 1/2011 | Cohn ............................. 709/225 |
| 2011/0029675 A1* | 2/2011 | Yeow et al. .................... 709/226 |
| 2011/0078652 A1* | 3/2011 | Mani et al. ..................... 717/105 |
| 2012/0096165 A1 | 4/2012 | Madduri et al. |

OTHER PUBLICATIONS

U.S. Appl. No. 14/021,793, filed Sep. 9, 2013, Titled: Virtual Resource Provisioning With Capacity Coloring.
U.S. Appl. No. 13/240,766, filed Sep. 22, 2011, Titled: Inferring Resource Allocation Decisions From Descriptive Information.
U.S. Appl. No. 12/973,746, filed Dec. 20, 2010, titled: Virtual Resource Provisioning With Capacity Coloring.
U.S. Appl. No. 13/240,766, filed Nov. 22, 2011, titled: Inferring Resource Allocation Decisions From Descriptive Information.

(Continued)

*Primary Examiner* — Phuc Tran
*Assistant Examiner* — Raul Rivas
(74) *Attorney, Agent, or Firm* — Kilpatrick Townsend & Stockton, LLP

(57) ABSTRACT

Techniques for provisioning computing resources utilize colorings of collections of resources. The collections may be networks of resources hosted by a computing resource provider that are operated under the direction of one or more customers of the resource provider. Colors may be applied to the collections of resources, such as by a customer of the resource provider. The same customer or another customer may request that resources be provisioned according to at least one relationship with one or more collections of resources having one or more colors. Resources may then be provisioned according to the request.

30 Claims, 11 Drawing Sheets

(56) References Cited

OTHER PUBLICATIONS

Houidi et al., "Virtual Resource Description and Clustering for Virtual Network Discovery", Communications Workshops, 2009. ICC Workshops IEEE International Conference, Jun. 14-18, 2009.

Jordan, "How to Connect Windows XP with Vista in a LAN", Oct. 9, 2010. [retrieved from http://web.archive.org/web/201 01009082913/ http://www.ehow.com/how__5845684__connect-windows-xp-vista-lan.html on Oct. 15, 2012].

* cited by examiner

OPTIMIZING COMMUNICATION AMONG COLLECTIONS OF COMPUTING RESOURCES

CROSS REFERENCE TO RELATED APPLICATIONS

This application incorporates by reference for all purposes the full disclosure of application Ser. No. 12/973,746, entitled "Virtual Resource Provisioning with Capacity Coloring" filed on Dec. 20, 2010.

BACKGROUND

It has become common for individuals and organizations to use computers and networks of computers to perform and assist in a wide variety of activities. Rather than owning and maintaining physical computers and associated facilities, it is becoming more and more common to provision virtual computer systems and other virtual computing resources with a specialized provider of such virtual resources. Such virtual resource provisioning can provide a number of advantages such as reduced cost of desired services and/or rapid response to changing service needs. However, conventional virtual resource provisioning has a number of shortcomings.

Virtual resource providers may operate large "fleets" of computer hardware and other resources used to implement the virtual resources provisioned to customers. It is not uncommon for there to be a deliberate layer of abstraction between the virtual computing resources and the underlying implementation resources that decouples the two from a user's point of view. Such decoupling can enable a virtual resource provider to engage in sophisticated allocation and re-allocation of the underlying implementation resources for purposes including efficient implementation resource utilization, load balancing and fault tolerance, without requiring the user to be concerned with implementation details. However, at times, users can become concerned about particular implementation details, for example, due to security concerns, performance concerns, and regulatory requirements. Some conventional virtual resource providers' attempts to address such concerns can have significant negative impacts on implementation resource allocation efficiency and/or effectiveness including increased computational and/or financial cost, and reduced fault tolerance.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
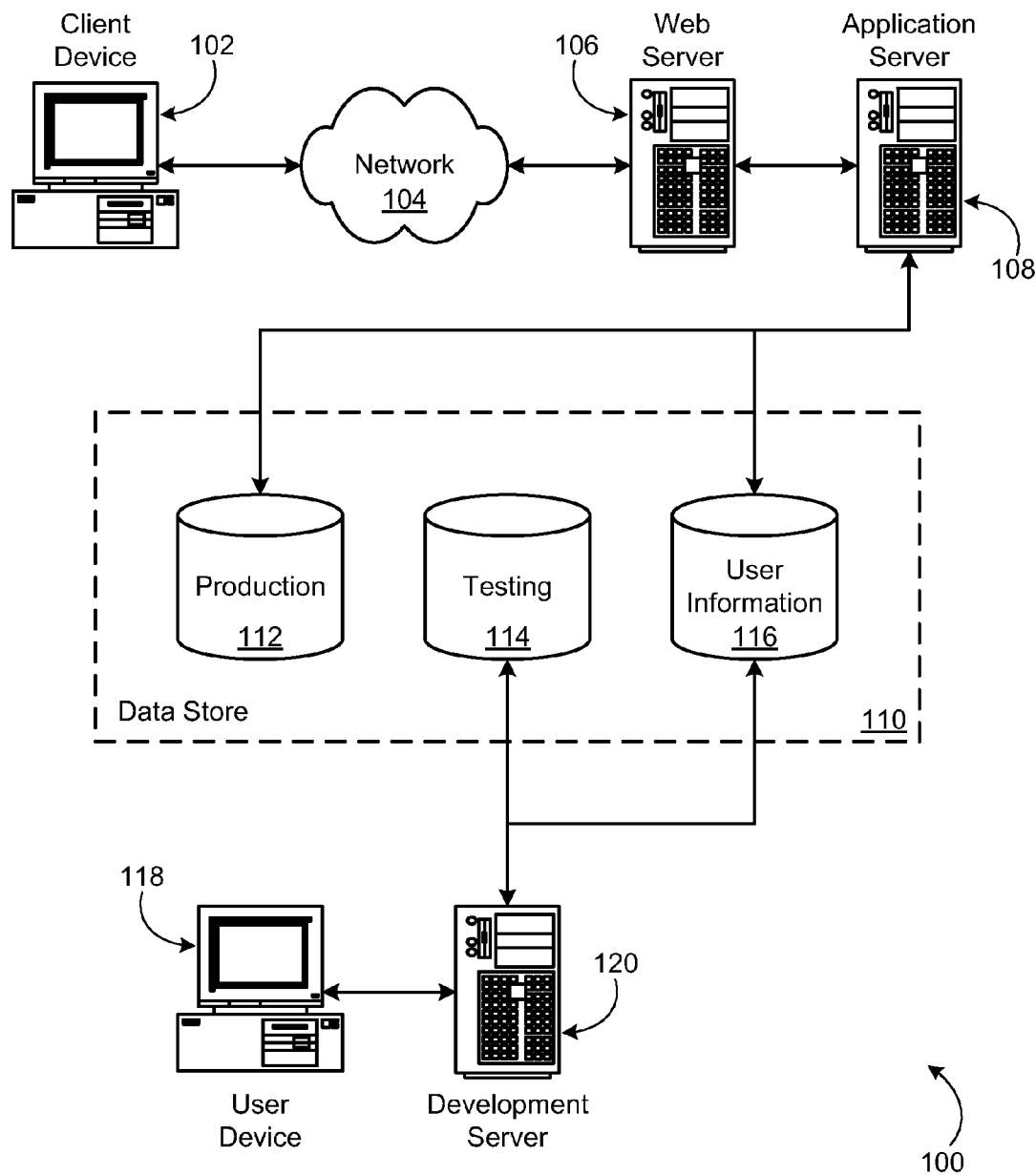
FIG. 1 is a schematic diagram illustrating an example environment for implementing aspects of the present disclosure in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Virtual resource provisioning may be enhanced by "coloring" virtual resource instances and/or underlying implementation resources. Particular resource colors may be associated with particular treatments during allocation of implementation resources to virtual resources. The term "color" is used herein in a graph theoretic sense. For example, a color may correspond to an alphanumeric string or other suitable distinguishing identifier specified by a user. Association with the identifier may be said to color a resource. In at least one embodiment, there may be different types of colors corresponding to different types of allocation treatment. For example, the types of colors may include an exclusory color type, an inclusive color type, and/or a proximity color type, as described in application Ser. No. 12/973,746, entitled "Virtual Resource Provisioning with Capacity Coloring," referenced above.

In at least one embodiment, collections of computing resources are able to be colored. A collection may be, for example, a network of resources hosted by a virtual resource provider where the network of resources is operated under the direction of a customer of the virtual resource provider. Such a collection is sometimes referred to as a virtual private cloud. Other types of collections are also possible, such as groupings of resources having a common characteristics, user-constructed groupings of resources, collections of networks, and, generally, any collection of resources that may be constructed. The coloring of the resources may be performed by various users involved in the use of the resources. Customers of the virtual resource provider may, for example, color their own and others' resources. As another example, the virtual resource provider may color resources.

In an embodiment, resource colorings are used in processes for provisioning or otherwise allocating resources. In one example, a customer of a virtual resource provider is able to request resources and specify conditions that involve one or more colors of one or more other resources. The one or more other resources may be resources of the customer, of another customer, or of the virtual resource provider. The conditions may be specified in various ways. For example, the specification of a color of a particular color type for a set of requested resources may indicate a condition that is required to be fulfilled or preferably fulfilled. In this manner, the color type itself indicates the condition.

As another example, a request to provision resources may specify a condition that involves one or more resources that have been colored with one or more colors. In this manner, a color type of a color of one or more colored resources does not necessarily indicate any conditions of the request. A customer may, for instance, have colored a network of resources with a particular color and may have made a request for new resources that specifies one or more conditions based on the particular color. The customer may specify that the requested resources should be provisioned in a location (such as a different data center) different from the resources of the particular color. In this manner, the customer may attempt to ensure that a failure of one or more of the resources of the particular color is unlikely to affect the requested resources, and vice versa. Similarly, the customer may specify that the requested resources should be provisioned in the same location (such as the same data center) as the requested resources. The customer may, for example, be attempting to locate the requested resources as close as possible to ensure that communications between the set of resources of the particular color and the requested resources are as fast as possible. The virtual resource provider may then attempt to provision the requested resources for the customer according to the conditions specified by the customer.

Conditions placed on colors of collections of resources may include notions of proximity. Users may specify, for example, that resources should be provisioned close to or far from resources colored with a particular color. Distance may be measured in various ways. For example, distance may mean geographic distance. Distance may also be measured in a way that takes into account characteristics of a network. Distance may be measured, for example, in terms of latency, bandwidth, and/or network hop counts between resources. For any definition of distance, distance to collection of resources may be determined as the minimum distance to any of the resources that are accessible from outside of the collection. The distance may also be determined in other ways, such as by determining a maximum value (which may be an upper bound for a measure of a network characteristic, such as latency). The collection may be accessible, for example, through one or more Internet protocol (IP) addresses and the distance to the collection may be determined as the minimum distance to any of the one or more IP addresses of the collection. As another example, proximity may be determined based at least in part on network usage or other costs connected with the transfer of information among resources. For instance, a user of resources may have to pay different charges for network traffic traveling through different provider networks. Generally, the cost of transferring information in one manner may be different than in other manners. Proximity may be determined such that the distance between a resource and at least one other resource is lower when the cost of transmitting information between the resources is lower. Generally, distance and other values used in one or more conditions may be measured in any manner suitable in particular circumstances.

As noted above, attempts to provision resources in accordance with one or more conditions on colored resources may be made. Such attempts may not always be successful. A virtual resource provider may, for instance, not have any available resources that satisfy a customer's request. As another example, conditions may be provided that are impossible to satisfy. For instance, a customer may require or prefer that resources be provisioned both close to and far from a collection of resources of a particular color. In some instances, conditions may not be structured in a manner that allows for a straightforward determination whether the conditions are satisfied. As an example, a request that resources be provisioned "close" to resources with a particular color may not specify a definition that allows a binary definition of whether resources are close or not close. A customer may, for example, specify that requested resources should be provisioned as close as possible to resources of a particular color. In such instances, attempts may be made to provision resources in a manner that confirms with the conditions as best as possible. For example, a request to provision resources "close" to resources of a particular color, for some definition of distance, may be completed by provisioning the requested resources as close as possible to the resources of the particular color.

In various embodiments, information may be provided that indicates how well requests to provision resources were or can be completed. A customer of a virtual resource provider may, for example, request provisioning of a virtual machine instance as close as possible to a set of resources colored with a particular color. The virtual resource provider may provision the virtual machine instance and indicate to the customer how close the virtual machine instance was provisioned to the resources of the particular color. For example, the virtual resource provider may indicate that the virtual machine instance has been provisioned within a certain number of network hops from the resources of the particular color. As another example, a customer of the virtual resource provider may request resources with one or more conditions and the virtual resource provider may provide a general indication of whether the conditions were met when fulfilling the request. In other words, the virtual resource provider may simply indicate whether it was able to fulfill the request according to the one or more conditions.

In some instances, conditions that take resource coloring into account may be used to improve the provisioning of resources over time. A virtual resource provider, for example, may provision resources for a customer. As the customer uses its provisioned resources, the virtual resource provider may measure the customer's use of other resources, determine whether performance for the customer may improve by re-provisioning the customer's resources, and, if applicable, re-provision the customer's resources as applicable. As a specific example, if the virtual resource provider detects that the customer's provisioned resources often access a service (of the customer, of another customer, or of the virtual resource provider) implemented using resources colored with a color, the virtual resource provider may then determine whether the customer's resources would perform better if moved closer to the resources of the color and, if applicable, migrate the customer's resources closer to the resources of the color, thereby decreasing latency, increasing bandwidth, and/or otherwise improving performance for the customer.

The above and other approaches discussed herein, and variations thereof, may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
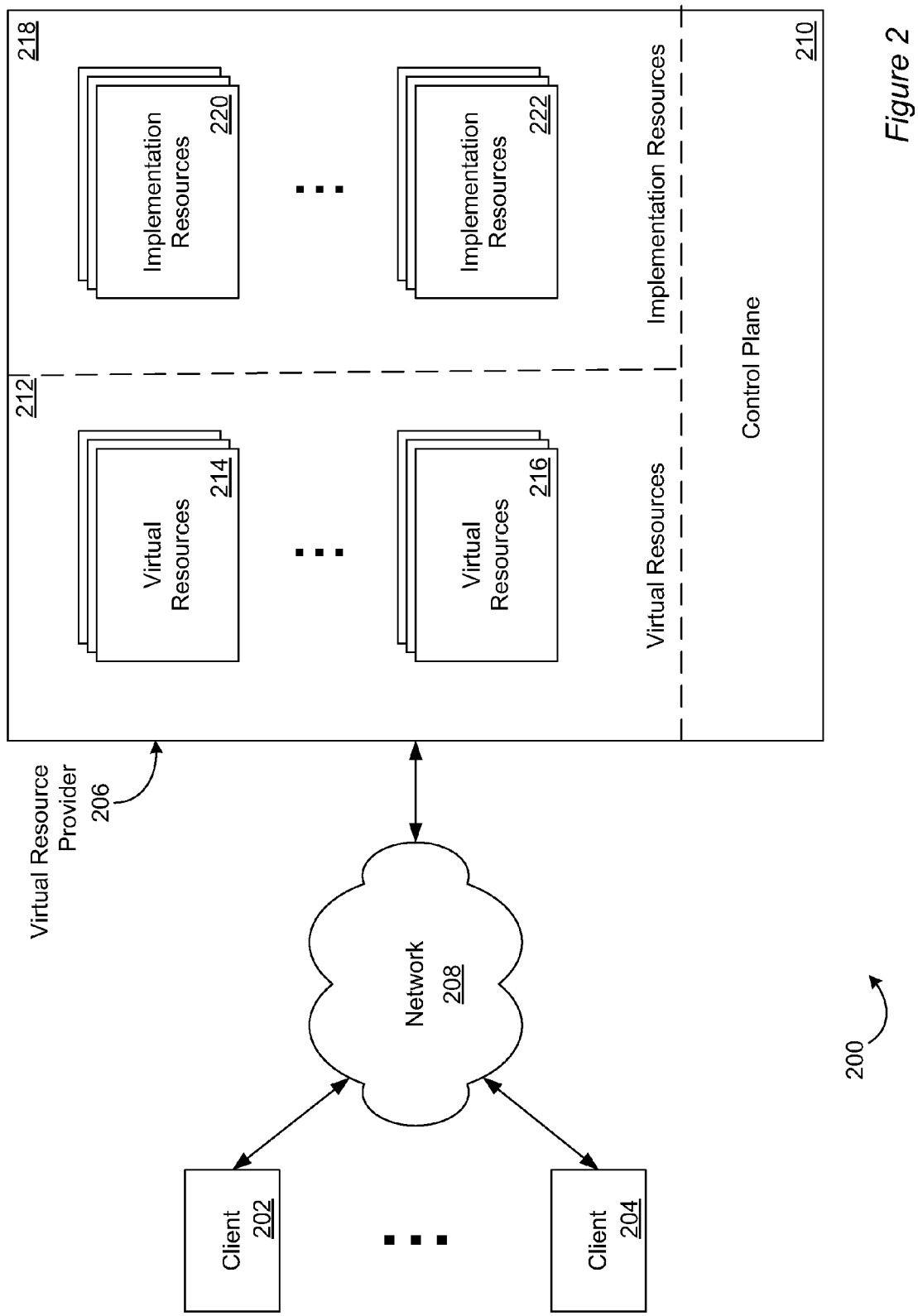
FIG. 2 is a schematic diagram depicting aspects of an example virtual resource provisioning architecture in accordance with at least one embodiment.

In at least one embodiment, one or more aspects of the environment 100 may incorporate and/or be incorporated into a virtual resource provisioning architecture. FIG. 2 depicts aspects of an example virtual resource provisioning architecture 200 in accordance with at least one embodiment. The example virtual resource provisioning architecture 200 includes multiple clients 202-204 communicatively connected to a virtual resource provider 206 over a network 208. For example, the clients 202-204 may correspond to computing devices such as the computing device 102 of FIG. 1 and/or client programs incorporated into such computing devices. The ellipsis between the client 202 and the client 204 indicates that the virtual resource provisioning architecture 200 may include any suitable number of clients although, for clarity, only two are shown in FIG. 2. Ellipses are used similarly throughout the drawings.

One or more of the clients 202-204 may be utilized by one or more customers of the virtual resource provider 206 to interact with a control plane 210 of the virtual resource provider 206, and thereby provision one or more virtual resources 212. Alternatively, or in addition, one or more of the clients 202-204 may be utilized (not necessarily by virtual resource provider 206 customers) to interact with provisioned virtual resources 212. The provisioned virtual resources 212 may include any suitable type and/or number of virtual resources 214-216. Examples of suitable virtual resources 212 include virtual computer systems, virtual network connections, virtual data stores, specialized data processing agents, media streaming agents including audio and video streaming agents, message queues, publish-subscribe topics configured to notify subscribers having subscriptions that match events published to the publish-subscribe topics, monitoring agents, load balancing agents, and suitable combinations thereof.

The virtual resource provider 206 may include any suitable type and/or number of implementation resources 220-222. Each of the virtual resources 214-216 may be implemented by a set of the implementation resources 218. In at least one embodiment, various implementation resources of the implementation resources 218 may be configured to participate in implementing, at least in part, multiple virtual resources of the virtual resources 212. Examples of suitable implementation resources 220-222 include virtual computer system (VCS) servers, data store servers, computers, server racks, networking hardware including switches, routers, gateways, bridges, hubs, repeaters, firewalls, and wireless transceivers, power supplies, generators, data centers, rooms in data centers, mobile data centers, as well as non-volatile storage devices including hard drives, processing units such as central processing units (CPUs), caches in processing units, processing cores in multi-core processing units, volatile storage devices such as memory modules including random access memory (RAM) modules, and RAM chips of multi-chip memory modules, network interface hardware and suitable combinations thereof. The control plane 210 may process virtual resource provisioning requests, manage allocation of virtual resources 212 to implementation resources 218 and/or manage allocation of implementation resources 218 to virtual resources 212. An example virtual resource provider control plane in accordance with at least one embodiment is described below in more detail with reference to FIG. 3.

Particular implementation resources 218 and/or particular sets of implementation resources 218 may correspond to points of failure and/or to failure risk domains associated with a failure probability and/or an annualized failure rate (AFR). For example, a particular type of hard drive may have an AFR of 1%. A data center may correspond to a risk domain capable of operating within specifications 99.8% of the time. At least a subset of such implementation resources and/or risk domains may be colorable. That is, the control plane 210 may associate such implementation resources and/or risk domains with a color for provisioning and/or allocation purposes. Further examples of colorable risk domains include geographical regions including earthquake risk zones and flood risk zones, domains defined by regulatory boundaries including political boundaries and organizational boundaries, domains corresponding to independent virtual resource providers, and domains corresponding to any suitable set of implementation resources.

At least a subset of the implementation resources 218 may implement, at least in part, multiple virtual resources, that is, may be multi-instance implementation resources. Multi-instance implementation resources may have a capacity measurable in implementation resource allocation units ("allocation units" or "slots") corresponding to minimum allocable portions of the multi-instance implementation resources. Some virtual resources may require no more than one allocation unit from a multi-instance implementation resource, while other virtual resources may require multiple allocation units. For example, a VCS server may have a capacity of sixteen allocation units, and a "small" type virtual computer system may require a single allocation unit at the VCS server, whereas a "large" type virtual computer system may require four allocation units at the VCS server. The virtual resource provider 206 may maintain virtual resources for multiple customers. When a multi-instance implementation resource is capable of participating in an implementation (e.g., a secure and/or private implementation) of multiple virtual resources for multiple customers, it is called a multi-tenant implementation resource.

The virtual resource provider 206 may maintain a general implementation resource pool containing a significant portion of the implementation resources 218 that is the default implementation resource pool from which to allocate implementation resources 220-222 to satisfy virtual resource provisioning requests. Alternatively, or in addition, the virtual resource provider 206 may maintain one or more implementation resource pools containing different subsets of the implementation resources 218. For example, different implementation resource pools may be established for different customers and/or sets of customers. In at least one embodiment, particular implementation resource pools may be dedicated to particular customers (e.g., contain implementation resources that are not shared with other customers of the virtual resource provider 206). Particular implementation resource pools may be special purpose and/or contain implementation resources of particular types. Particular transition procedures may be associated with entry to and exit from particular implementation resource pools. In at least one embodiment, an implementation resource pool is an example of a colorable subset of the implementation resources 218 of the virtual resource provider 206.

Figure 3:
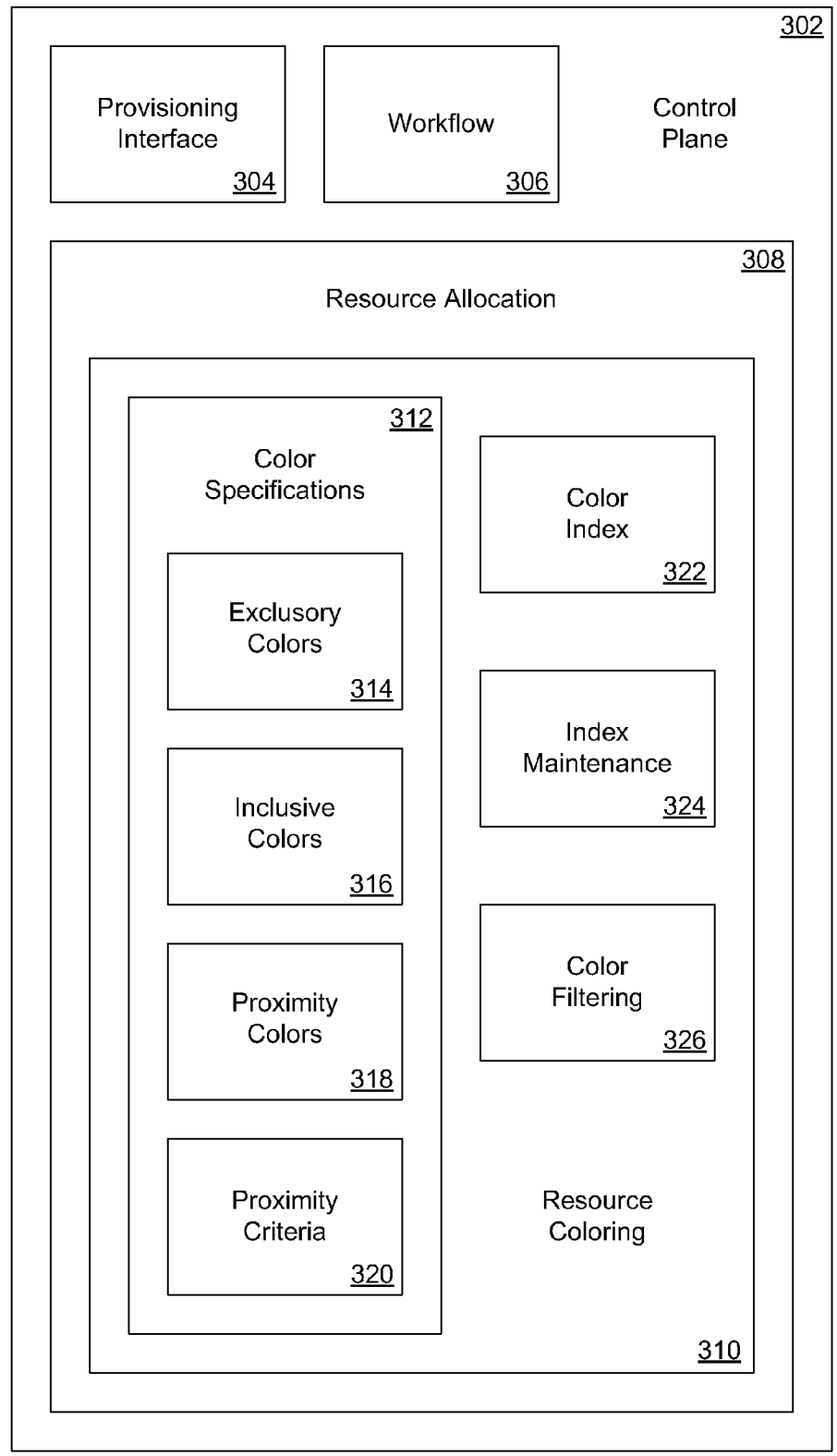
FIG. 3 is a schematic diagram depicting aspects of an example control plane in accordance with at least one embodiment.

Provisioning, configuration, re-configuration, and/or de-provisioning (collectively, "provisioning") of virtual resources may be controlled by the control plane 210 of the virtual resource provider 206. FIG. 3 depicts aspects of an example control plane 302 in accordance with at least one embodiment. The control plane 302 of FIG. 3 is an example of the control plane 210 of FIG. 2. The control plane 302 may include a provisioning interface 304 configured at least to receive virtual resource 212 provisioning requests from one or more of the clients 202-204, a workflow component 306 configured at least to guide responses to provisioning requests in accordance with one or more provisioning workflows, and a resource allocation component 308 configured at least to manage allocation of implementation resources 218 to virtual resources 212.

The provisioning interface 304 may include any suitable provisioning interface elements. Examples of suitable provisioning interface elements include interface elements that correspond to requests to provision the virtual resources 212 (FIG. 2), interface elements that provide access to virtual resource 212 configuration information, and one or more interface elements enabling authentication to establish authority for such provisioning-related operations. The provisioning interface 304 may incorporate and/or be incorporated in a user interface (UI) such as a graphical user interface (GUI), a Web-based interface, a programmatic interface such as an application programming interface (API) and/or a set of remote procedure calls (RPCs) corresponding to provisioning interface elements, a messaging interface such as a messaging interface in which the interface elements of the provisioning interface 304 correspond to messages of a communication protocol, and/or any suitable combination thereof. Web-based interfaces may include Web services interfaces such as Representational State Transfer (REST) compliant ("RESTful") Web services interfaces or Simple Object Access Protocol (SOAP) compliant Web services interfaces or other "non-RESTful" Web services interfaces.

In at least one embodiment, the provisioning interface 304 and the resource allocation component 308 may create, and/or cause the workflow component 306 to create, one or more workflows that are then maintained by the workflow component 306. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the resource allocation component 308.

The workflow component 306 may modify, further specify and/or further configure established workflows. For example, the workflow component 306 may select particular implementation resources 218 (FIG. 2) of the virtual resource provider 206 to execute and/or be assigned to particular tasks. Such selection may be based at least in part on the computing resource needs of the particular task as assessed by the workflow component 306. As another example, the workflow component 306 may add additional and/or duplicate tasks to an established workflow and/or reconfigure information flow between tasks in the established workflow. Such modification of established workflows may be based at least in part on an execution efficiency analysis by the workflow component 306. For example, some tasks may be efficiently performed in parallel, while other tasks depend on the successful completion of previous tasks.

As part of provisioning a virtual resource, the provisioning interface 304 and/or the workflow component 306 may request that the resource allocation component 308 determine the appropriate set of the implementation resources 218 (FIG. 2) required to implement the virtual resource, determine whether the required implementation resources are available and/or in accordance with virtual resource provider 206 allocation policies, and/or allocate the required implementation resources. The resource allocation component 308 may incorporate any suitable resource allocation and/or resource scheduling algorithm. Various aspects of such algorithms are well known to those of skill in art, so only some details are described herein. The resource allocation component 308 may include a resource coloring component 310 configured at least to establish and maintain resource color definitions and color associations with respect to the virtual resources 212 and/or the implementation resources 218 of the virtual resource provider 206.

The resource coloring component 310 may include a color specifications component 312 configured at least to establish and maintain specifications and/or definitions (collectively, "specifications") of resource colors of a variety of types. The types of resource color maintained by the color specification component 312 may include resource color types corresponding to exclusory color specifications 314, inclusive color specifications 316, and proximity color specifications 318. Such specifications may include a name of a corresponding resource color, and a scope of the corresponding resource color. For example, a resource color name may correspond to a string of alphanumeric and/or Unicode characters or other suitable distinguishing resource color identifier. The resource color scope may correspond to a specification domain with respect to the virtual resource provider 206 (FIG. 2) within which the resource color identifier is required to be unique. Examples of resource color specification scopes include scoping to a customer or set of customers, scoping to an implementation resource pool or set of implementation resource pools, scoping to an implementation resource type or set of implementation resource types, and scoping to the virtual resource provider 206 as a whole.

Proximity color specifications 318 may be associated with one or more sets of proximity criteria specifications 320. For example, each proximity color defined by one of the proximity color specifications 318 may be associated with one of the sets of proximity criteria specifications 320. Proximity criteria may specify criteria for determining a proximity of implementation resources in the implementation resource network. For example, the proximity criteria may include a specification of a proximity metric based at least in part on communication connection capacity, communication connection bandwidth, and/or communication connection one-way or round-trip latency. Alternatively, or in addition, the proximity criteria may include one or more sets of proximity thresholds corresponding to proximity regions in the implementation resource network. Such proximity regions may corresponding to levels of oversubscription to communication connection resources in the implementation resource network. As another alternative, or further in addition, the proximity criteria may be based at least in part on oversubscription ratios with respect to communication connection resources. The specifications maintained by the color specification component 312 may be specified by an authorized user with the provisioning interface 304 and/or a suitable administrative interface (not shown in FIG. 3).

The resource coloring component 310 may further include a color index 322. The color index may track current associations between particular resource colors and particular sets of virtual resources 212 (FIG. 2) and/or implementation resources 218. For example, the color index 322 may track which of the implementation resources 220-222 are currently painted with particular resource colors. An index maintenance component 324 may maintain the color index 322 responsive to resource allocations by the resource allocation component 308 and/or updates to resource color specifications 314-318 and/or proximity criteria specifications 320. A color filtering component 326 may filter a set of candidate implementation resources (e.g., being considered by the resource allocation component 308) with respect to the resource color specifications 314-318 and/or proximity criteria specifications 320.

Figure 4:
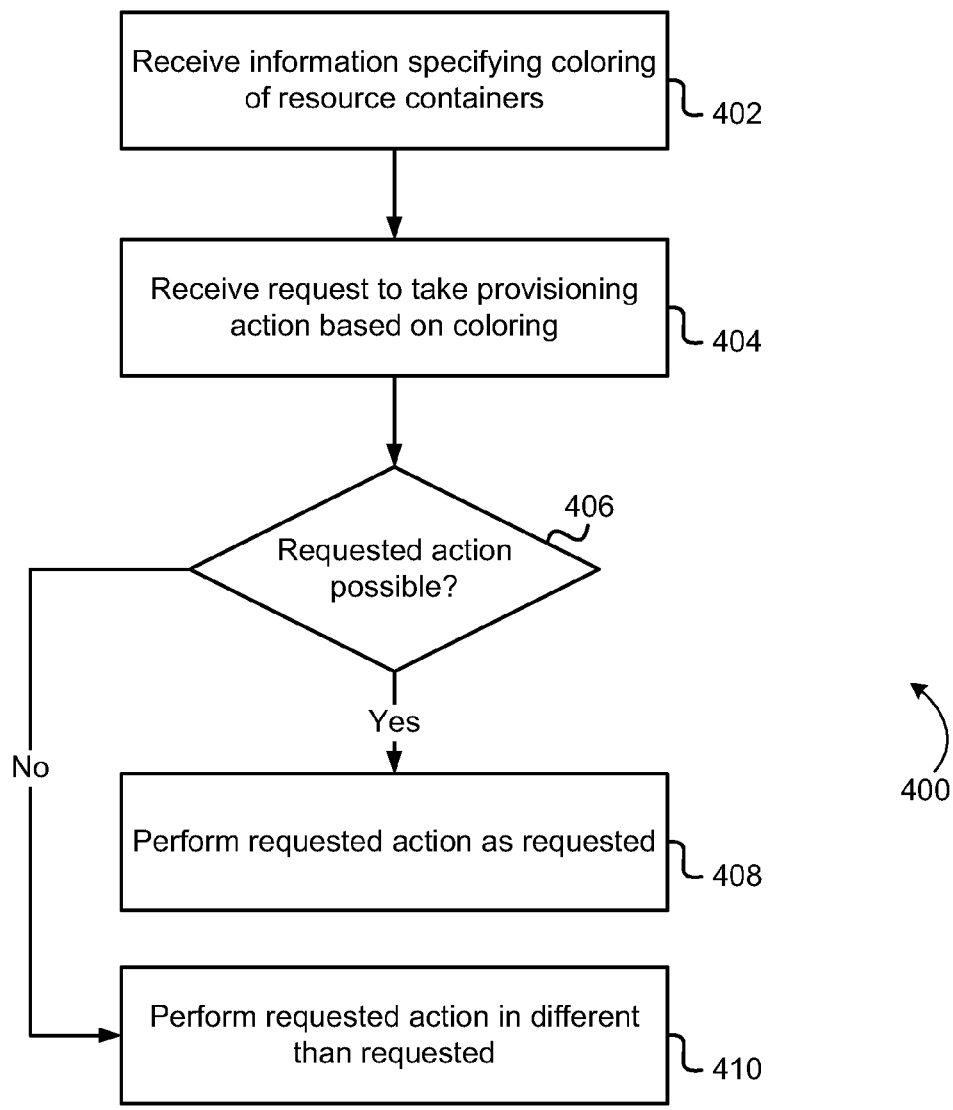
FIG. 4 is a schematic diagram depicting aspects of an example process for provisioning resources according to coloring information, in accordance with at least one embodiment.

FIG. 4 shows an illustrative example of a process 400 for provisioning resources in accordance with an embodiment. Some or all of the process 400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors.

In an embodiment, the process 400 includes receiving 402 information specifying the coloring of one or more resource containers. A user, for example, of a customer of a virtual resource provider may, through a user interface, provide information about one or more colors to be applied to a resource container. A resource container may be a set of virtual and/or implementation resources. The set may be defined by one or more characteristics. An example resource container is a network of resources hosted by a virtual resource provider and operated under the direction of a customer of the virtual resource provider. In other words, a container may be a network of a customer's resources that are hosted by a virtual resource provider. As discussed above, containers of resources may be defined in various ways.

In an embodiment, a request to take a provisioning action based on the information specifying the coloring is received 404. The requested action may be, as an example, a request to provision one or more virtual machine instances. The request may specify that the virtual machine instances are required to and/or are preferred to be proximate to another container of resources painted with another color. As noted, the requests may specify other conditions instead of or in addition to conditions based on proximity. Generally, the request may include any information specifying one or more conditions that are required and/or preferred to be fulfilled.

In an embodiment, a determination is made 406 whether the requested action is possible. For example, if the request was to provision one or more virtual machine instances close to resources having a particular color and such a provisioning is possible, a determination may be positive. Similarly, if no resources are available for provisioning, then the determination may be negative. In an embodiment, if the determination is made that the requested action is possible, then the request action is performed 408. For example, virtual machine instances that have been requested to be provisioned, in an embodiment, are then provisioned.

Similarly, if the determination is made that the requested action is not possible, the requested action may be performed 410 nonetheless, although not exactly as requested. Continuing the example where the request is a request to provision one or more virtual machine instances close to a container of resources having a particular color, and no resources close to the resources colored with a particular color are available, the virtual machine instances may nonetheless be provisioned, but utilizing resources that are not close to the resources having the particular color. Of course, other actions may be taken instead of performing the requested action. For example, a message to a user that a requested action could not be performed may be provided and no resources may be provisioned unless the user changes or otherwise updates his or her request or otherwise authorizes the requested action to be completed in a manner different from that originally requested.

Figure 5:
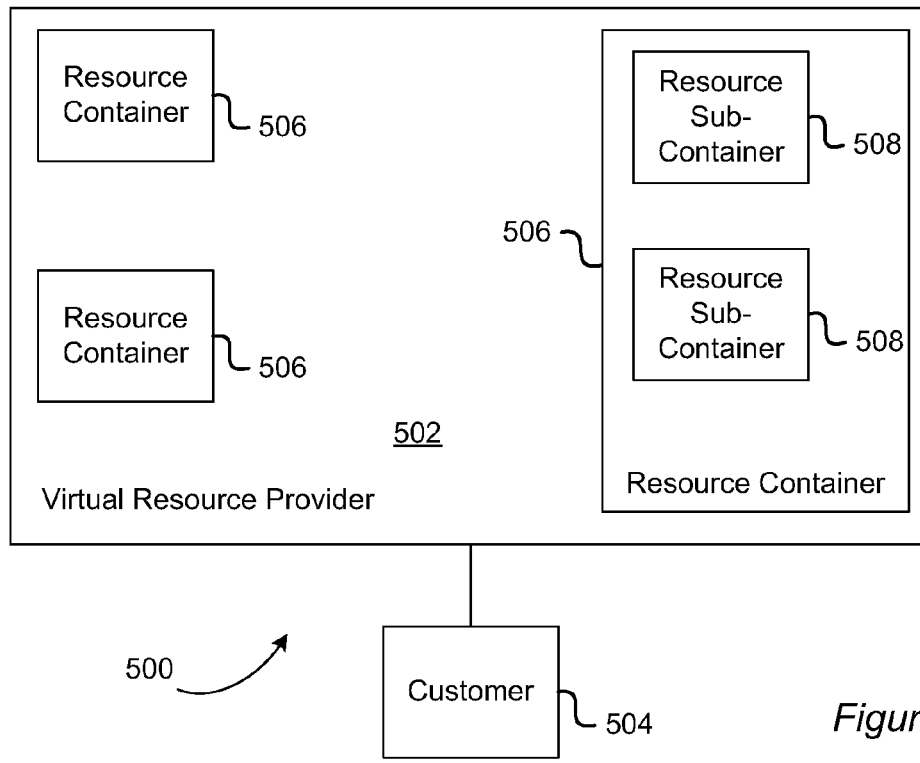
FIG. 5 is a schematic diagram illustrating an example environment for implementing aspects of the present disclosure in accordance with at least one embodiment.

FIG. 5 shows an illustrative example of an environment 500 in which various aspects of the present disclosure may be practiced. The environment 500 illustrated in FIG. 5 may be used to implement the process 400 described above in connection with FIG. 4, or variations thereof. The example environment 500 shown in FIG. 5 includes a virtual resource provider 502 that provides, as a service, the use of implementation resources to a customer 504. The customer 504 may be, for example, an organization that utilizes resources of the virtual resource provider 502 as part of its operations. While not shown in FIG. 5, the environment 500 could include other customers also using the resources of the virtual resource provider 502.

In an embodiment, as shown in FIG. 5, the resources of the customer 504 are arranged according to a plurality of containers. Containers may be, for example, networks of the customer 504 that are hosted by the virtual resource provider 502. Each of the containers 506 may be used for a different purpose. For example, one resource container 506 may be used for management-related activities such as operating accounting, human resources, and other software whereas another resource container 506 may be used to provide a service to one or more third parties. The various containers 506 of the customer 504 may be hosted by the virtual resource provider 502 in the same data center or among several data centers. In addition, resources in one container 506 may be located in the same data center or spread out among a plurality of data centers, depending on how the containers are defined.

As illustrated in FIG. 5, resource containers of the customer 504 may also include resource sub-containers 508. A resource sub-container may be, for example, a sub-network (subnet) of a virtual private cloud. A sub-container may also be merely a subset of the resources of a container. The members of the subset may share a common characteristic that defines the subset, or may be otherwise selected. A user of the customer may, for instance, manually define the members of the subset. While not shown in the figures, a customer may also include sub-containers of sub-containers and, generally, any collection of containers that is useful for the customer's purposes.

Figure 6:
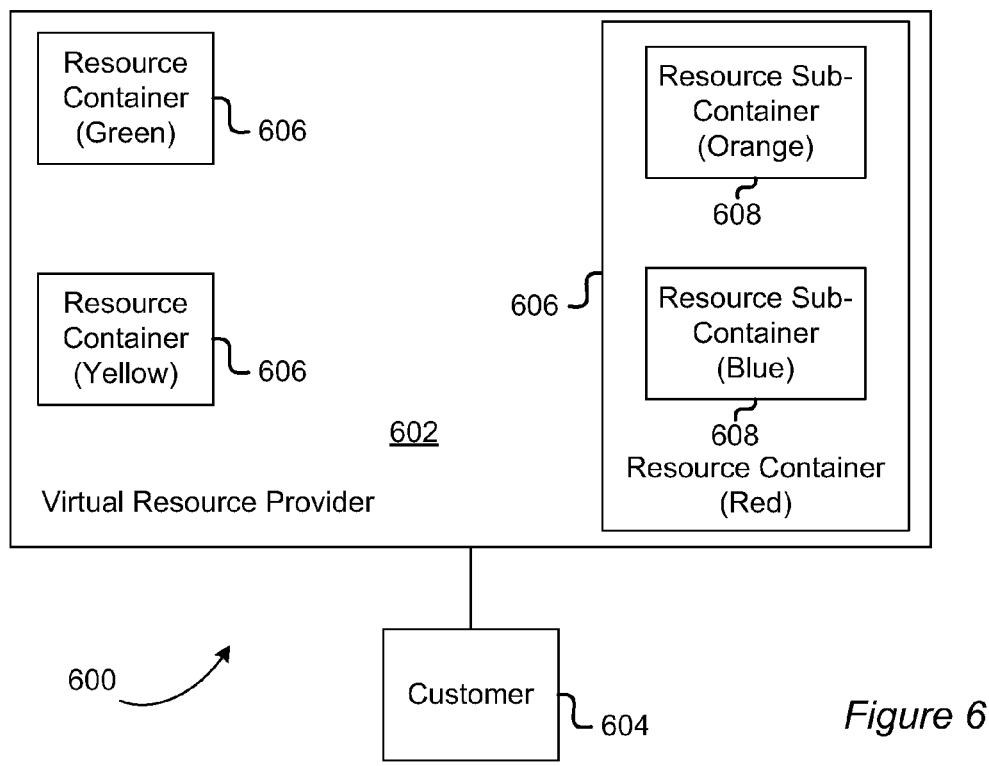
FIG. 6 is a schematic diagram illustrating the example environment of FIG. 5 when colored in accordance with at least one embodiment.

FIG. 6 shows an illustrative example of an embodiment in which various aspects of the present disclosure may be practiced. In this example, the environment 600 is illustrated in order to demonstrate how colors may be applied to resource containers of a customer of a virtual resource provider. The environment 600 shown in FIG. 6 may be, for example, the environment 500 discussed above in connection with FIG. 5 after coloring of resources by the customer. For instance, as shown in FIG. 6, the environment 600 includes a virtual resource provider 602 that provides, as a service, the use of implementation resources by a customer 604. The customer 604, in this example, also has a plurality of resource containers 606.

As noted, however, this particular example the customer has colored its resource containers 606. For example, as shown in the figure, the customer 604 has a resource container 606 colored "green," a resource container 606 colored "yellow," and a resource container 606 colored "red." The customer may have selected or otherwise specified these labels (designations) through an interface used to communicate with the virtual resource provider. The virtual resource provider may have also applied one or more of the colors to one or more of the resource containers by, for example, detecting a set of resources having a common characteristic and applying a color to the set of resources.

Also shown in FIG. 6, the customer 604 has sub-containers of the container colored "red." As illustrated, the sub-containers have been colored by the customer, by the virtual resource provider, or otherwise. As shown, the customer 604 has one resource sub-container 608 colored orange and another resource sub-container 608 colored blue. In this manner, it may be considered, for example, that resources of the resource sub-container 608 labeled "orange" are also labeled "red" because the resource sub-container 608 labeled "orange" is a sub-container of the resource container 606 labeled "red." However, not all resources in the resource container colored "red" would also be colored "orange," since not all resources of the resource container colored "red" are also in the resource sub-container 608 colored "orange."

Figure 7:
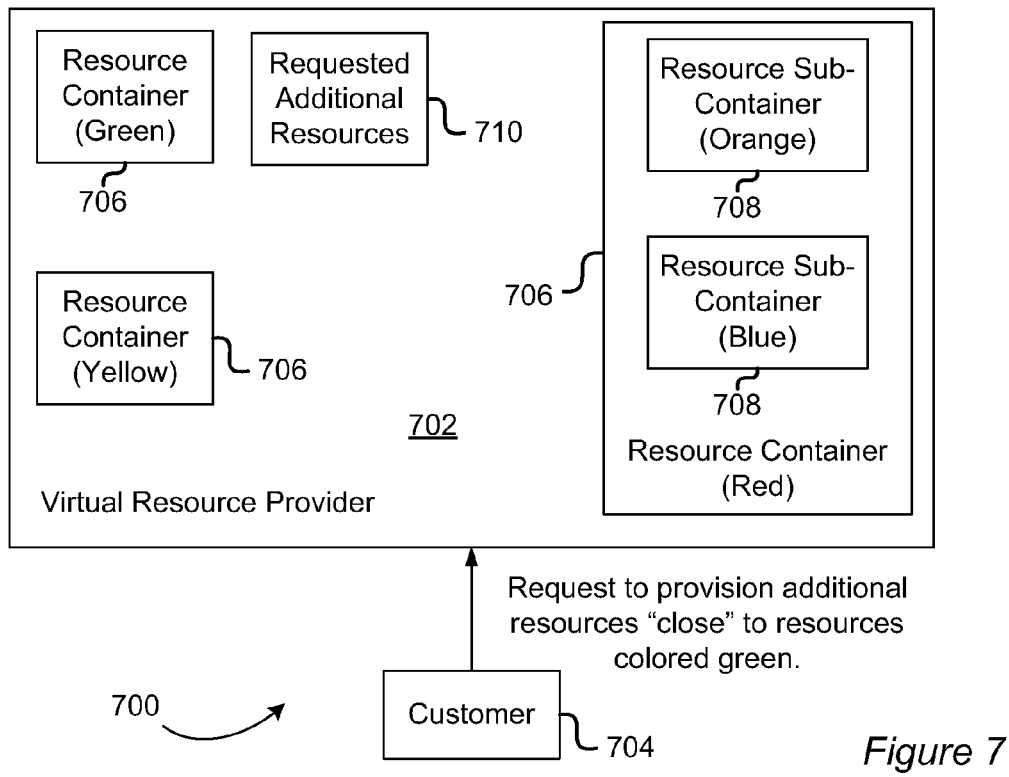
FIG. 7 is a schematic diagram illustrating the example environment of FIG. 6 upon an example provisioning of resources in accordance with at least one embodiment.

In accordance with various embodiments of the present disclosure, customers of the virtual resource provider are able to utilize colorings of resources in order to provision or otherwise manage resources. For example, FIG. 7 shows an illustrative example of an environment 700 in which resources are provisioned according to a resource coloring. The environment 700 may be the environment 600 discussed above in connection with FIG. 6. For instance, in this particular example, the environment 700 includes a virtual resource provider 702 that provides use of implementation resources for at least one customer 704. The customer 704, in this example, also has resources allocated according to a plurality of resource containers 706 that the customer 704 has painted. Thus, in this example, as with FIG. 6, the customer 704 has a resource container 706 colored "green," a resource container 706 colored "yellow," and a resource container 706 colored "red." In addition, the resource container 706 colored "red" may include a plurality of resource sub-containers 708 that are also colored. In this example, for instance, as with FIG. 6, the resource container 706 colored "red" includes a resource sub-container 708 colored "orange," and another resource sub-container 708 colored "blue."

In the environment 700 shown in FIG. 7, a request to provision additional resources close to resources colored "green" has been received by the virtual resource provider 702. A workflow of a virtual resource provider 702 has provisioned requested additional resources 710 close to the resource container 706 colored "green." While FIG. 7 shows the additional resources 710 being physically close to the resource container 706 colored "green," and while the word "close" may refer to geographic proximity, the word "close" may be used in other contexts. For example, proximity may be measured in other ways that may be meaningful to users of the environment 700 shown in FIG. 7. Proximity may be measured, for example, according to latency, bandwidth, network hops, and/or in other ways. Generally, proximity may be measured according to any metric which may be useful to one or more users of an environment such as the environment shown in FIG. 7.

Figure 8:
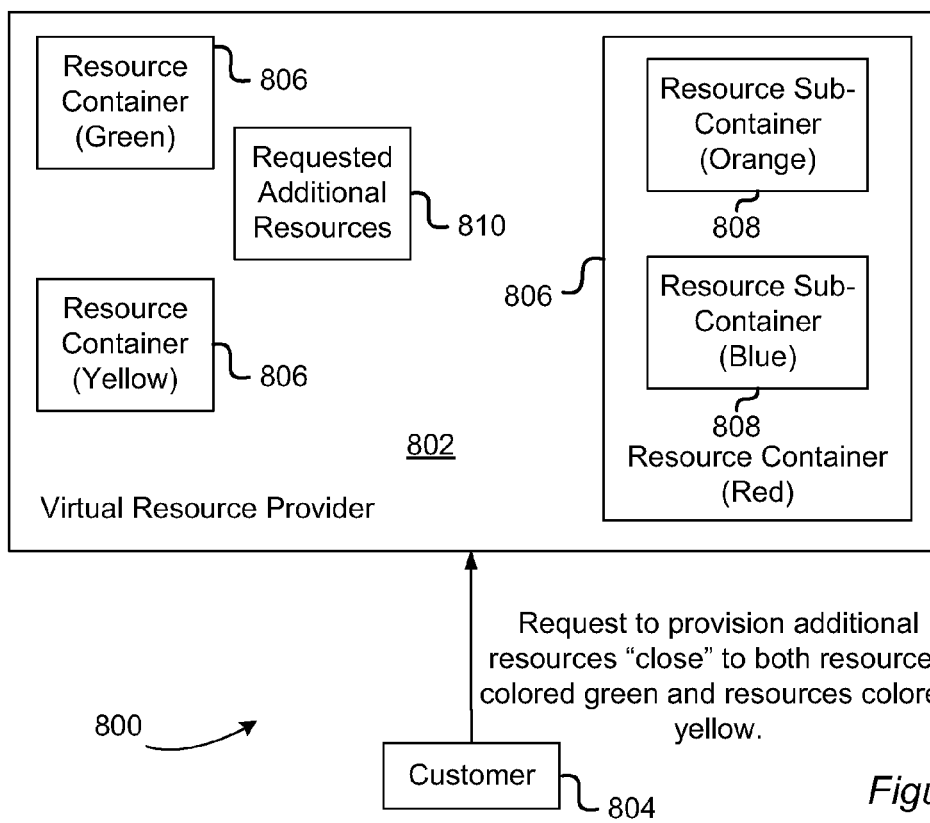
FIG. 8 is a schematic diagram illustrating the example environment of FIG. 6 upon another example provisioning of resources in accordance with at least one embodiment.

Multiple colors may be used in requests in connection with provisioning virtual resources. For example, a customer of a virtual resource provider may find it desirable to provision a virtual machine instance that is close to two different services, such as services that provide information from corresponding different databases. Accordingly, FIG. 8 shows an illustrative example of an illustrative example 800, in which multiple colors may be used. The environment 800 may be the environment 600 described above in connection with FIG. 6. The environment 800, in this example, therefore includes a virtual resource provider 802 and a customer 804 which may interact as described above. The customer 804 utilizes resources of the virtual resource provider and these resources may be allocated according to a plurality of resource containers 806. These resource containers 806 may be colored by the customer or in any manner. For example, in this example, as with FIGS. 6 and 7, the customer 804 has a resource container 806 colored "green" and resource container 806 colored "yellow" and a resource container 806 colored "red." The resource container 806 colored "red" has a resource sub-container 808 colored "orange" and a resource sub-container colored "blue."

In this particular example, however, the customer 804 makes a request to the virtual resource provider 802 to provision additional resources that are close to both resources colored "green" and resources colored "yellow." The customer, for example, may wish to have the requested additional resources be able to access resources of the container colored "green," and resources of the resource container 806 colored "yellow" quickly. Thus, in this manner, the virtual resource provider in response has provisioned additional resources 810, in a manner that is close to both to the resource container 860 colored "green" and the resource container 806 colored "yellow." As shown in FIG. 8, the availability of resources may determine how close resources are able to be provisioned to other resources. Thus, in this particular example, to illustrate this point, the requested additional resources 810 are shown to be provisioned closer to the resource container 806 colored "green" than to the resource container 806 colored "yellow." This may be due to, for instance, an inability to provision the requested resources closer to the resources colored "yellow."

Input from the customer may be received that aids the virtual resource provider 802 in determining how to provisional virtual resources. For example, the customer 804 may indicate that it is more important to have the additional resources provisioned close to the resource container colored "green" than to the resource container colored "yellow." Similarly, the customer may indicate that resources must be within a certain distance to resources of one color and as close as possible to resources of another color. In this manner, a workflow utilized to provision the requested additional resources may take this into account when provisioning resources.

Figure 9:
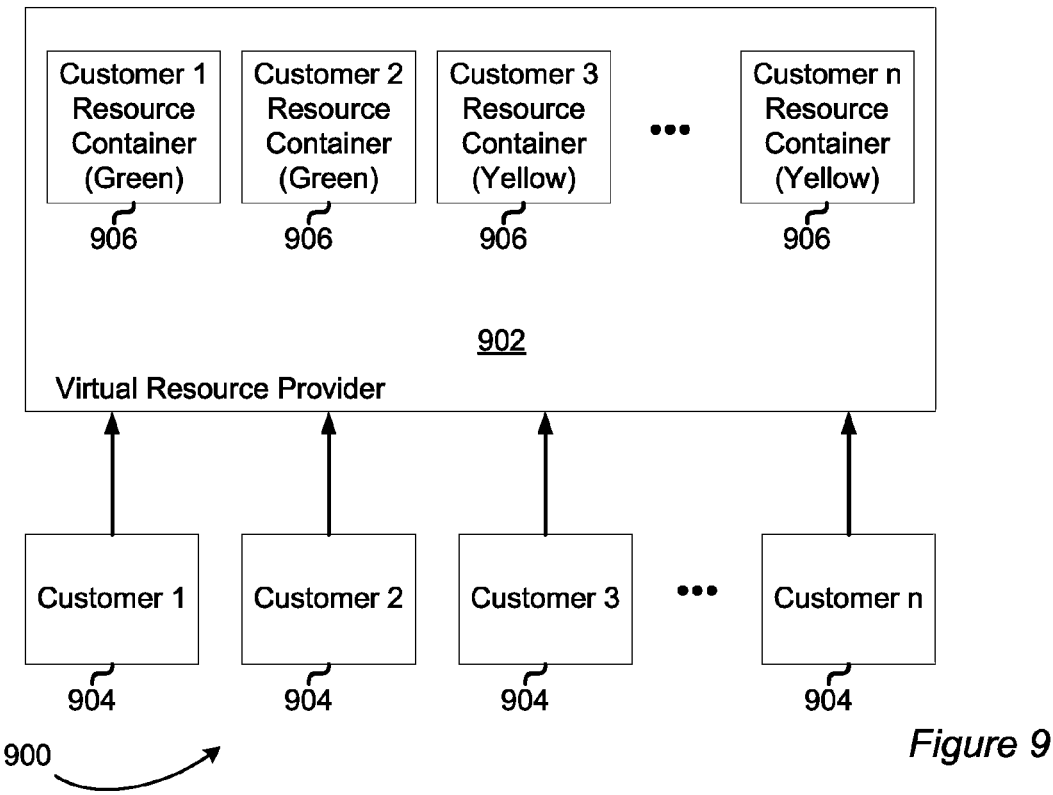
FIG. 9 is a schematic diagram illustrating an example environment for implementing aspects of the present disclosure in accordance with at least one embodiment that provides for multiple tenants of a virtual resource provider to collaborate.

As noted above, different customers of a virtual resource provider may each color their resource containers. Also, resources of one customer may be accessible to one or more other customers. Accordingly, FIG. 9 shows an illustrative example of an environment 900 which may be used to implement various aspects of the present disclosure. The environment 900 shown in FIG. 9 may be an environment similar to one of the environments described above. In this example, however, different aspects of environment 900 are illustrated in the figure. In particular, in FIG. 9, a virtual resource provider 902 is shown as having a plurality of customers 904. Each of the customers 904 may utilize various resources of the virtual resource provider 902 for various reasons. As with the figures described above, in FIG. 9, each of the customers 904 of the virtual resource provider 902 has resources of the virtual resource provider 902 allocated according to various resource containers. In this example, each customer 904 has a corresponding resource container. While FIG. 9 shows each customer of the virtual resource provider 902 having one resource container 906, any of the customers 904 of the virtual resource provider 902 may have more than one resource container. In addition, the resource containers may be different types of containers for various customers. A resource container 906 for one customer 904, for example, may be a network of resources, while a resource container of another customer may simply refer to all of the resources allocated to the customer, or a set of resources defined by one or more characteristics of the resources. Further, while not illustrated, each of the customers 904 may have more than one resource container and one or more of each customer's resource containers may include one or more sub-containers.

As shown in FIG. 9, one or more of the customers 904 may color resources of the virtual resource provider 902. A customer 904 labeled Customer 1, for example, is shown in FIG. 9 to have colored a resource container 906 "green." Similarly, a customer 904 labeled as Customer 2 has colored a corresponding resource container "green" as well. In an embodiment, colorings made by customers are not global with respect to the virtual resource provider. For example, the customer resource container 906 colored "green" by the customer labeled Customer 1 may not be labeled "green" for other customers. In other words, the other customers may not be able to identify the resources of Customer 1 simply by specifying "green." The resources in the resource container, for example, may not be accessible by the other customers. Thus, while FIG. 9 shows two customers, Customer 1 and Customer 2, having labeled respective customer resource containers "green," that does not necessarily mean that the resources in resource container 906 of Customer 1 are labeled identically as the resource container 906 labeled "green" by Customer 2.

In some instances, however, colors may be global. A customer of the virtual resource provider 902 may, for example, want to allow a certain amount of access to other customers. One customer, for example, may provide a service that may be utilized by other customers in offering their own services. The customer then may charge the other customers for use of that service. In this manner, a customer may label his or her resources in a manner that is publicly available. The customers who make their coloring publicly available may publish the names in a domain name service or other registry so that other customers are able to determine those names. In this manner, a customer such as Customer 3 who wishes the utilize a service offered by Customer 1 may make a request to have one or more resources provisioned close to the resources of Customer 1 that are labeled "green." Because multiple customers may use the label "green," the request may specify an identifier of Customer 1 in addition to the color. The request may refer to, for instance "Customer_1.Green." In this manner, the request is indifferent to any resources of Customer 2 that also happen to be labeled "green" and any provisioning of the resources of Customer 3 close to the resources of Customer 2 labeled "green" may be purely coincidental.

In some instances, it may be desirable to color resources according to various fault boundaries. A fault boundary may be an abstract division of resources based on the possibility of resource failure. As an example, two resources may be considered to be on opposite sides of a fault boundary if a particular failure would affect one resource but not the other. For example, if a certain type of failure, such as a power outage, or hardware failure, would affect one resource, but not the other, the two resources may be considered to be on opposite sites of a fault boundary. Therefore, two resources powerable by separate backup generators may be, for instance, considered to be on opposite sides of a fault boundary that corresponds to a division. Fault boundaries may also be determined based on other factors. Two computing devices on separate racks may be considered to be on different sides of a failure boundary because the failure of one rack would only affect one of the computing devices. As yet another example, resources implemented in one data center may be considered to be on a side of a fault boundary different from resources implemented in another data center. Thus, fault boundaries may correspond roughly to geographical boundaries.

Figure 10:
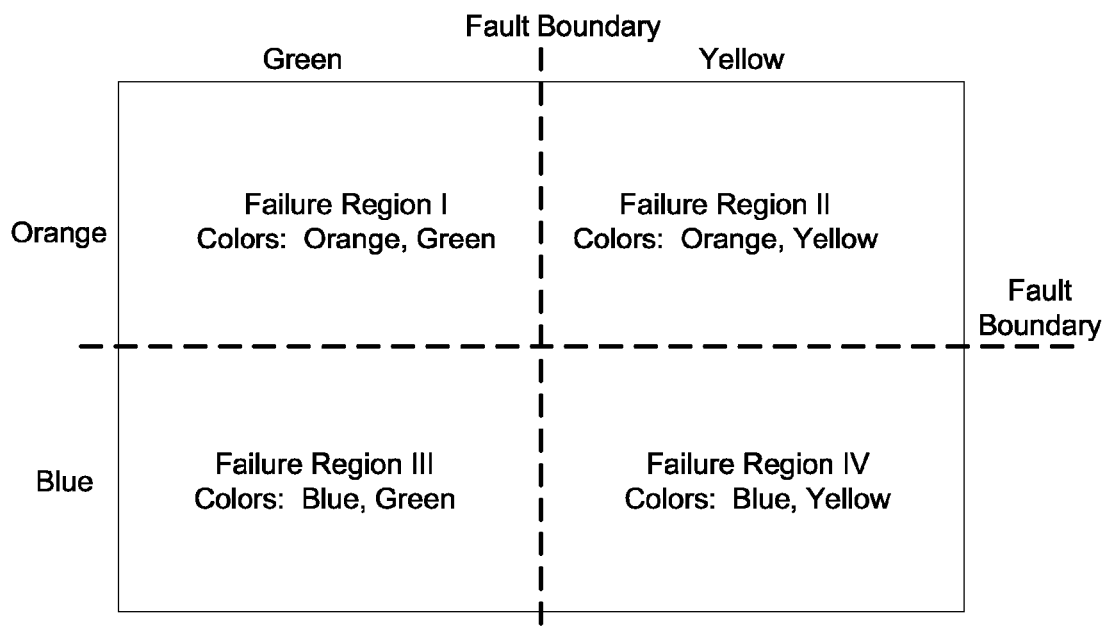
FIG. 10 is a schematic diagram illustrating resources of a virtual resource provider's resources being colored according to fault boundaries in accordance with at least one embodiment.

FIG. 10, accordingly, shows an illustrative example of how resources may be colored according to boundaries. In particular, FIG. 10 shows a schematic diagram 1000 that shows various regions defined by fault boundaries. For the purpose of illustration, FIG. 10 shows a vertical fault boundary and a horizontal fault boundary. In this example, resources to the left of the vertical fault boundary are colored "green" and resources to the right of the vertical fault boundary are colored "yellow." The resources colored "green," for example, may be powerable by a different generator than the resources colored "yellow," although generally the fault boundary can be any fault boundary. Also in FIG. 10, resources above the horizontal fault boundary are colored "red" and resources below the horizontal fault boundary are colored "blue." To provide a concrete example, continuing the example given above, if the vertical fault boundary separates resources based on which generator powers the resources, the horizontal fault boundary, on each side of the vertical fault boundary, may distinguish between resources hosted on one rack and resources hosted on another rack. Thus, in this manner, a resource in the region labeled region I corresponding to the colors "green" and "orange" is powered by the same generator as a resource in the region labeled region III corresponding to the colors "green" and "blue;" yet they are on different racks. The colors corresponding to the various fault boundaries may be specified by a customer, by a virtual resource provider, or both.

Using FIG. 10 as an example, coloring of resource containers defined by fault boundaries (and/or other boundaries) may be used to provision resources in a manner consistent with customer needs. A customer may, for example, operate a service in Region I of FIG. 10. For backup purposes, the customer may wish to operate a duplicate service so that the duplicate service is available if the other service becomes inoperable. The customer may then request resources to be provisioned in another region. For instance, continuing the illustrative example where the fault boundaries in FIG. 10 correspond to different generators and racks, by requesting that resources be provisioned in Region II, the customer is requesting resources that are backed up by a different generator, thereby making it likely that the customer's service would still be available should the generator corresponding to Region I stop working. Similarly, by requesting that resources be provisioned in Region III, the customer is requesting resources on a rack different from the rack corresponding to Region I, thereby making it likely that the customer's service will be available should the rack corresponding to Region I fail. By requesting that resources be provisioned in Region IV, therefore, the customer is requesting resources that are both on a rack and powered by a generator different from the resources corresponding to Region I, thereby making it likely that the customer's service will be available in the event both the rack and generator corresponding to Region I fail.

Figure 11:
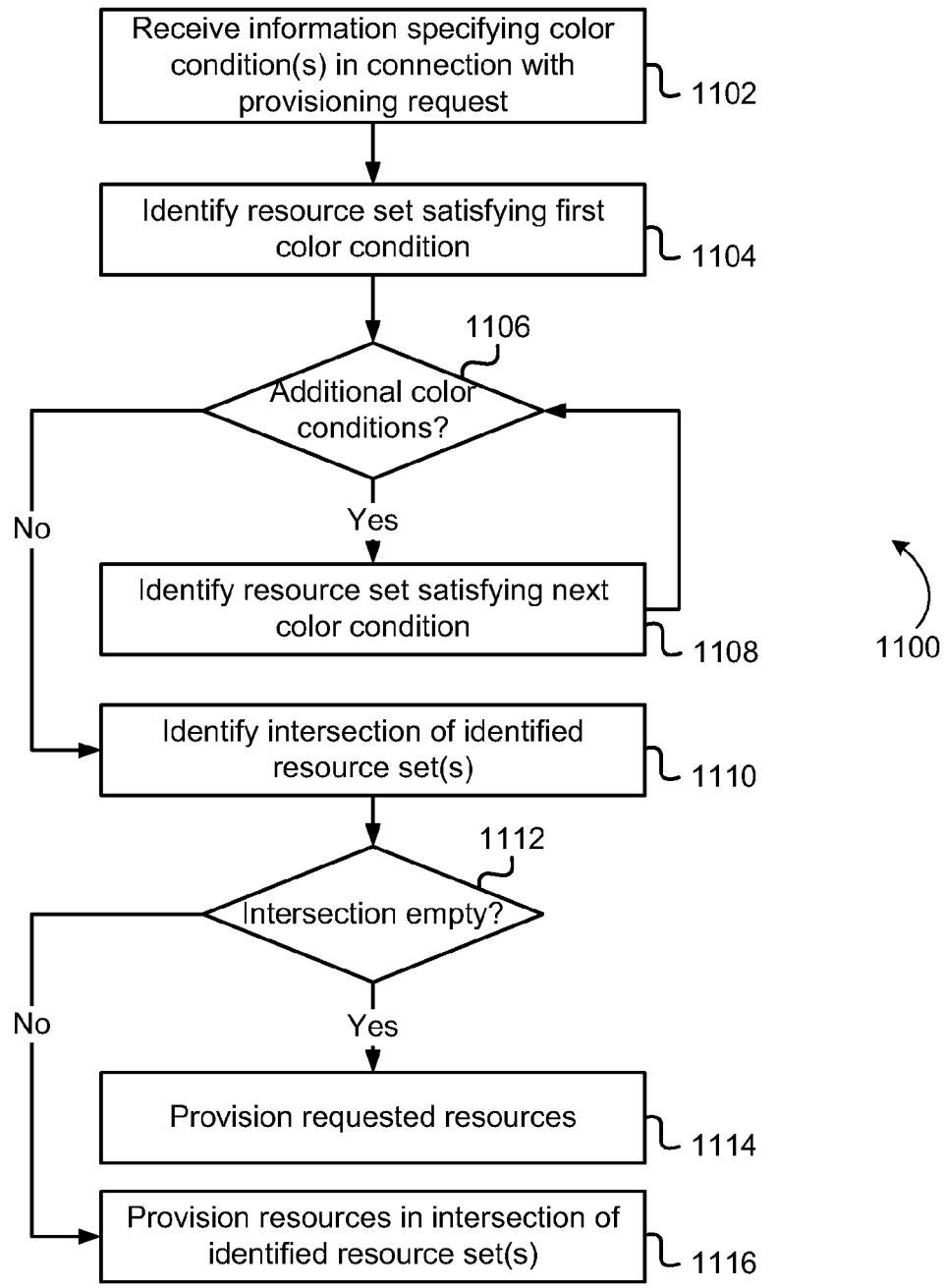
FIG. 11 is a schematic diagram depicting aspects of an example process for provisioning resources according to coloring information, in accordance with at least one embodiment.

As noted above, various embodiments of the present disclosure allow multiple colors to be used when provisioning resources. FIG. 11 shows an illustrative example of a process 1100 that may be used to implement various aspects of the present disclosure in contexts where one or more colors are utilized. In this particular example, FIG. 11 shows a process 1100 for provisioning resources in a manner that utilizes multiple conditions in connection with multiple colors. In an embodiment, the process 1100 includes receiving information specifying color conditions in connection with a provisioning request. As noted above, for example, a customer may request one or more resources to be provisioned in a manner that is close to resources colored "green" and close to resources colored "blue." As will be described more fully below, implementation resources may be located in a manner that attempts to locate implementation resources that are both close to resources colored "green" and close to resources colored "blue." As another example, the color conditions may specify that resources should be provisioned close to resources labeled "green" and far away from resources labeled "red." "Far away" may refer to a location that is on an opposite side of a fault boundary. The reason for this may be that a customer does not want a failure of the resources colored "red" to affect operation of the resources to be provisioned upon making the request.

Generally, the conditions can be any conditions that may be used in order to provision resources based on color. In an embodiment, a set of resources satisfying a first color condition is identified 1104. For example, if the first condition is that resources should be close to resources colored "green," available resources that are considered to be close to resources that are colored "green" are identified. The available resources may be, for example, resources that are not currently allocated to any user. In an embodiment, a determination is make 1106 whether there are additional color conditions received in connection with the provisioning request. If there are additional color conditions, then, in an embodiment, a set of resources satisfying the next color condition are identified 1108 and a determination is again made 1106 whether there are additional color conditions. In this manner, for each color condition, a set of resources that satisfy the color condition is identified.

Once all the sets of resources satisfying each color condition are identified, that is, when there are no additional color conditions, in an embodiment, an intersection of the identified sets of resources is identified 1110. As an example, if the color conditions were that the provisioned resources should be close to resources colored "green," and close to resources colored "red," then available resources that are both close to resources colored "green" and close to resources colored "red" are identified. However, available resources that are close to resources colored "green" but not to resources colored "red" would not be identified in this particular example. Once the intersection of the identified sets of resources are identified 1110, a determination is made 1112 whether the intersection is empty. In an embodiment, the intersection being empty may signify that there are no available resources that satisfy all of the color conditions. In such an instance, the requested resources may be provisioned 1114 in another manner. For example, the requested resources may be provisioned in a manner that satisfies most, but not all, of the specified color conditions. As another example, the requested resources may be provisioned in a manner that satisfies one or more conditions that have additionally been specified as being more important than other conditions. Generally, the requested resources may be provisioned in any suitable manner and additional or alternative actions may be taken. For instance, an error message that the requested resources were unable to be provisioned according to the request may be provided. A user may then decide whether or not to relax the specified conditions.

If, however, determination is made 1112 that the intersection is not empty, then the resources are provisioned 1116 in the intersection of the identified sets of resources. The resources may be provisioned, for example, using any of the resources in the intersection. Further analysis may be performed in order to optimize the selection of available resources to be used for provisioning.

Figure 12:
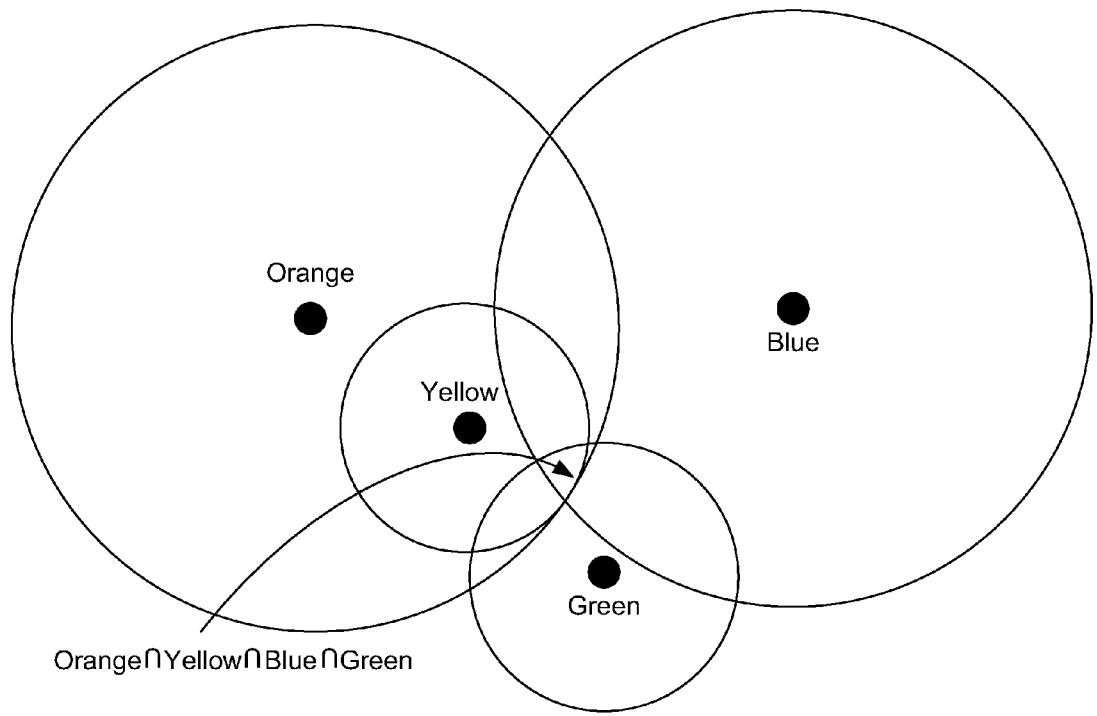
FIG. 12 is a schematic diagram representing selection of resources for provisioning in accordance with at least one embodiment.
Figure 13:
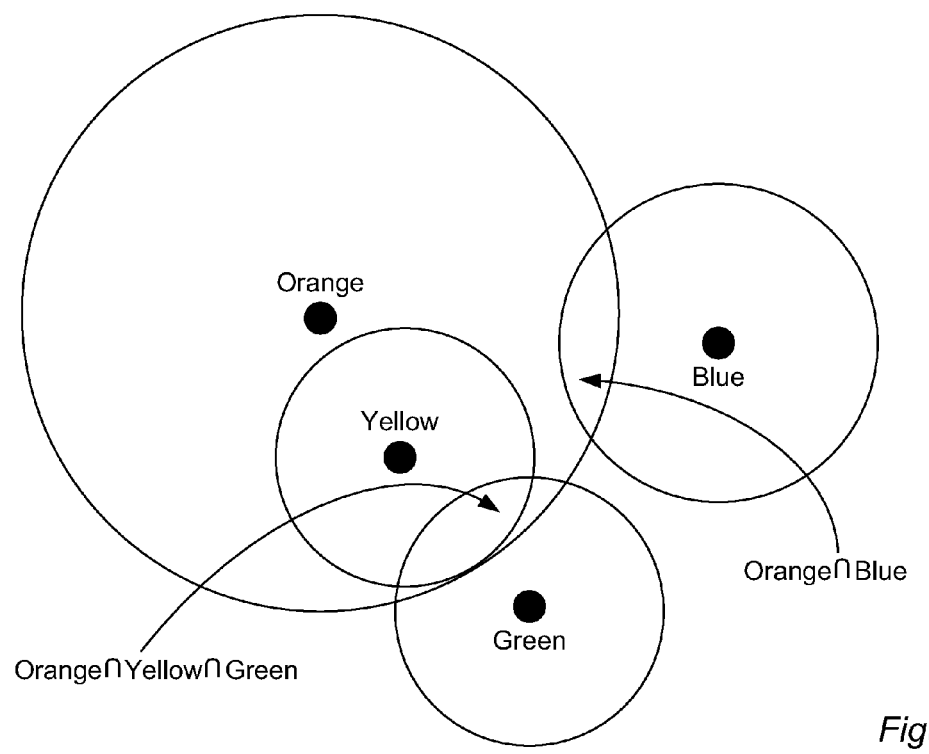
FIG. 13 is another schematic diagram representing selection of resources for provisioning in accordance with at least one embodiment.

FIGS. 12 and 13 provide visual representations of how the process 1100 described above in connection with FIG. 11 may be performed. FIG. 12 shows a particular example by which the process described in connection with FIG. 11 may be used to provision resources. In FIG. 12, a plurality of circles are shown, each having a center labeled with a color. The interior of each of the circles in this example corresponds to resources satisfying a condition involving a particular color. As one example, the largest circle shown in FIG. 12 has a center labeled "blue." Thus, the interior of the circle with the center labeled "blue" corresponds to a set of resources satisfying some conditions on the color "blue." The interior of the circle with the center labeled "blue" may, for example, correspond to all available resources that are close to resources labeled "blue" for some definition of "close." Similarly, the interior of the circle with the center labeled "blue" may correspond to available resources that are far from blue for some definition of the word "far." Similarly, FIG. 12 shows circles having centers labeled "orange," "yellow," and "green," where the interior of each of the circles corresponds to available resources that satisfy a condition on a corresponding color. If a request is made to provision resources in a matter that satisfies conditions on resources colored with colors orange, blue, yellow, or green, available resources satisfying all of those conditions may be found in the intersection of the four circles shown in FIG. 12.

As noted, however, it may not be possible to satisfy all conditions that a customer may specify. FIG. 13, for example, shows circles which may be circles that represent resources in the manner described above in connection with FIG. 12. For example, the largest circle shown in FIG. 13 has a circle in the center labeled "orange," an interior of which corresponds to available resources satisfying some conditions involving the color orange. Such are resources that are considered to be close to the center labeled "orange." As with FIG. 12, FIG. 13 has circles with centers labeled "orange," "blue," "yellow," and "green." If a request was made to provision resources with conditions utilizing the colors orange, yellow, green, and blue, the process described in FIG. 11 will first attempt to identify a set of resources in the intersection of the set represented by each of the circles in FIG. 13. However, as shown in FIG. 13, the intersection of each set would be empty. The resources corresponding to the circle having a center labeled "blue," for example, does not intersect with circles having a center labeled "green." Therefore, as shown in FIG. 13, there are no available resources that satisfy both the conditions on resources colored "blue" and the conditions on resources colored "green."

Thus, an attempt may be made to provision resources in another manner. For example, as labeled in FIG. 13, the intersection of the circle inside the center labeled "orange," "yellow," and "green" is nonempty. The resources corresponding to this intersection may be used to provision resources in a manner that satisfies the most conditions possible, but not all of the conditions. However, in some instances, it may be desirable to provision the resources using other available resources. For example, the request to provision resources may have indicated that it is desirable to satisfy conditions on "orange," "yellow," and "green" about various portions to have a condition on resources colored "blue." Thus, the set of available resources corresponding to the intersection of the interior of the circles having centers labeled "orange" and "blue" may be used to provision resources in such a case.

Figure 14:
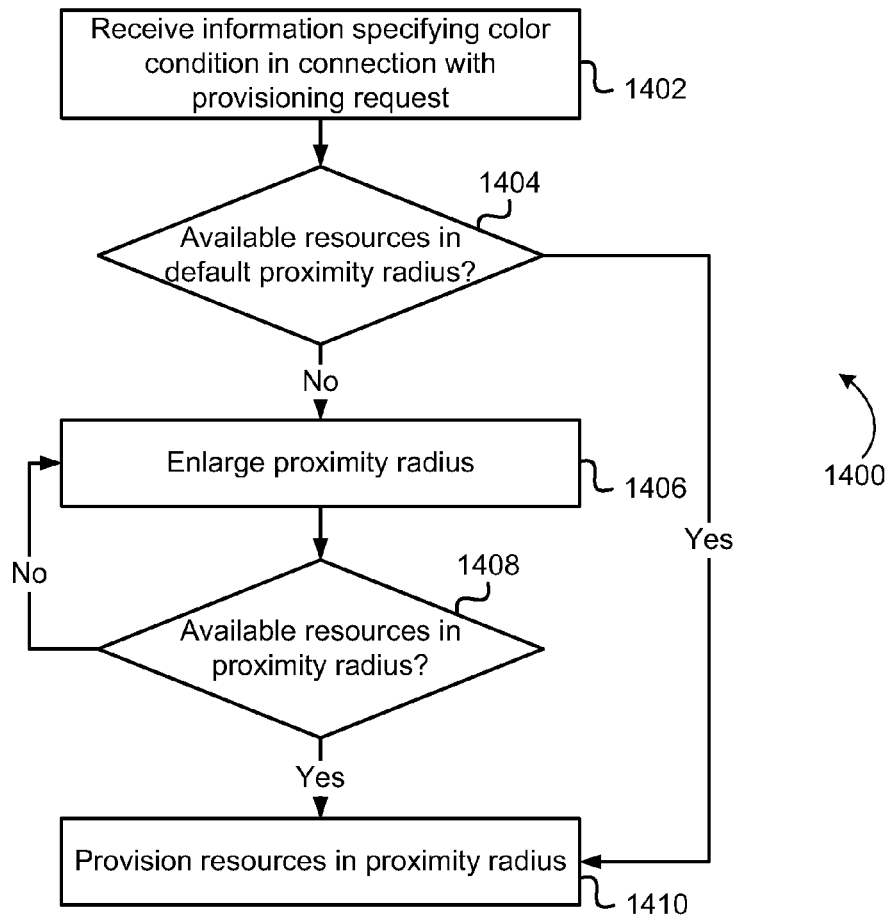
FIG. 14 is a schematic diagram depicting aspects of an example process for provisioning resources according to coloring information, in accordance with at least one embodiment.

In some instances, efforts may be made to attempt to provision resources in the best manner possible. A virtual resource provider may, for instance, attempt to optimally select resources from a set of resources that satisfy one or more color conditions. As noted, in some instances, customer conditions may not be able to be satisfied with available resources, and, therefore, it may be desirable to identify available resources that come as close to satisfying one or more conditions as possible. Also, in some instances, conditions may be structured in a manner that precludes a binary determination whether the conditions are satisfied or not. A request, for example, may specify that resources should be provisioned as close as possible to a container of resources colored with a particular container. Accordingly, FIG. 14 provides an illustrative example of a process 1400 which may be used to provision resources. In general, as will be described below, the process 1400 includes relaxing a color condition until available resources are found. In this manner, for example, if a request for provisioning resources includes a connection with a condition to be as close as possible to resources colored "green," for some definition of "close," the process 1400 may be used to identify available resources that are as close as possible.

In an embodiment, information specifying a color condition in connection with the provisioning request is received 1402. The information may be received in any suitable manner, such as described above. In an embodiment, a determination is made 1404 whether there are resources available in a default proximity radius. As used herein, a resource is available in a proximity radius when the resource satisfies a condition that is based at least in part on the proximity radius value. For example, if the condition is to be as close as possible to the resources colored "green" and its proximity is measured in terms of network hops, a determination may be made whether there are any available resources within a certain number of network hops of any resources that are colored "green." Similarly, if the condition is to be as close as possible to the resources colored "green" and its proximity is measured in terms of latency, a determination may be made whether there are any available resources with latency between any resources that are colored "green" being less than or equal to some default value. The proximity radius may be any value that may be used to determine whether resources satisfy any condition that is based at least in part on the value.

In an embodiment, if there are no resources available in the default proximity radius, then the proximity radius is enlarged 1406. In other words, a condition that is based on the proximity radius is relaxed. Continuing with the examples of the previous paragraph, a maximum number of network hops or a latency value may be increased. In an embodiment, once the proximity radius is enlarged 1406, a determination is made 1408 whether there are available resources in the enlarged proximity radius. Thus, with the example with network hops, the number of network costs may be increased and a determination may be made whether there are any resources within the increased number of hops to resources colored "green." In an embodiment, when a determination is made that there are available resources within the default or a larger proximity radius, then resources are provisioned 1410 if in the proximity radius.

Various combinations and variations of the processes described herein are considered as being within the scope of the present disclosure. For example, as discussed, FIG. 14 shows a process in which conditions on resources colored with a particular color are relaxed until suitable resources are identified. This process, or variations thereof, may be used in connection with the process described in connection with FIG. 11. For example, when multiple conditions are specified, one or more of the conditions may be relaxed in order to identify available resources that satisfy the conditions. Looking to FIG. 13, for example, one or more conditions corresponding to one or more of the circles may be relaxed, thereby enlarging one or more of the circles until the interiors of the circles have a nonempty intersection. Further, customers may specify which conditions may be relaxed or may otherwise influence performance of such a process.

Figure 15:
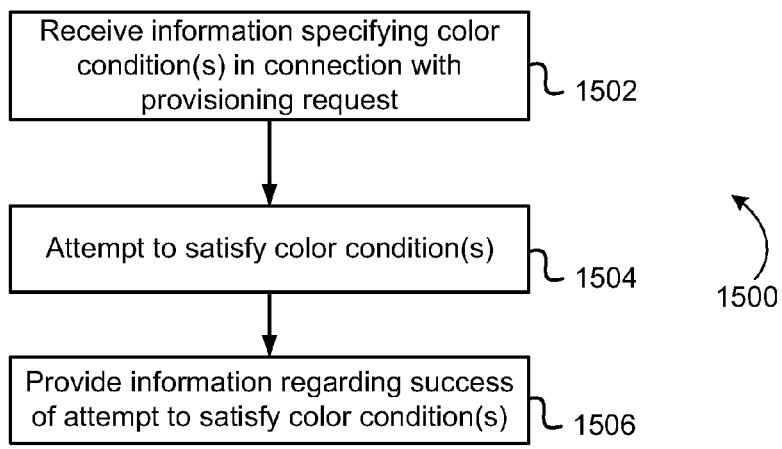
FIG. 15 is a schematic diagram depicting aspects of an example process for providing information to a customer of a virtual resource provider, in accordance with at least one embodiment.

In many instances, it is desirable for a user to know how well the provision resources have been fulfilled. A customer may make a request knowing that the request may or may not be fulfilled according to any specified conditions, depending on resource availability. However, it may be desirable to the customer to know whether any specified conditions have been fulfilled in order to accurately gauge the performance of its resources and, generally, to have more information about its resources. FIG. 15 shows an example of a process 1500 that may be used to notify users how all the sets within the resources were made. In an embodiment, information specifying one or more color conditions in connection with the provisioning request are received 1502.

In an embodiment, the process 1500 includes receiving 1502 information that defines one or more color conditions in connection with the provisioning request. The information specifying one or more color conditions may be received in the manner such as that described above. In an embodiment, an attempt is made 1504 to satisfy the color conditions that have been specified. Any way of attempting to satisfy the color conditions may be used, such as those described above. In an embodiment, upon attempting to satisfy the color conditions, information is provided 1506 regarding success of the attempt to satisfy the color conditions. Information may be provided in any suitable manner. For example, a message may be sent to a user saying that the attempt to satisfy the color conditions was successful. More detailed information may also be provided. For example, in a provisioning request having a condition regarding proximity to resources of a particular color, information may be provided regarding how close the newly provisioned resources are to the resources colored with a particular color. The information may be in terms of a unit of measurement corresponding to a metric for measuring proximity or may be a relative number. A relative number may, for example, say that, on a scale from one to ten, the resources were provisioned in a manner corresponding to a score somewhere in the scale. Generally, any suitable information may be provided.

Figure 16:
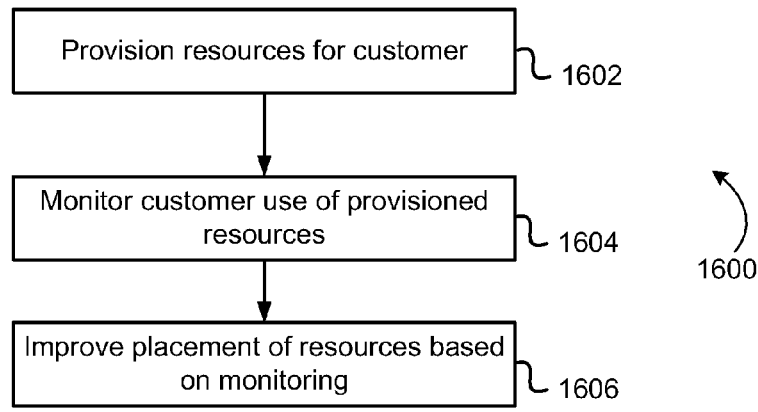
FIG. 16 is a schematic diagram depicting aspects of an example process for improving arrangements of resources, in accordance with at least one embodiment.

In some instances, it may be desirable to include the provisioning of resources from one or more customers over time. When customers initially make a request for resources, as an example, the customers may not appreciate the various options they have in provisioning resources. A user, for example, may not realize that his or her application may execute better if executed on a virtual machine instance that is provisioned close to a particular resource container. FIG. 16 therefore provides an illustrative example of a process 1600 that may be used to include provisioning of resources over time for a customer. In an embodiment, the resources for a customer are provisioned 1602. The provisioning of resources may be done in any suitable manner such as by associating one or more virtual machine instances. As applications of the customer are executed over time, the customer's use of the provisioned resources is monitored 1604. Measured quantities may be, for example, network requests, and generally any aspects of network operation that may be measured.

In an embodiment, upon monitoring the customer's use of the provisioned resources, the placement of resources based on the monitoring is improved 1606, if applicable. Placement of resources based on the monitoring may be performed in any suitable manner. As one example, existing provisioned resources may be left as is, but future resources may be provisioned in a manner that would improve performance. If a customer, for example, scales up in response to increased demand, newly requested resources may be provided and is provisioned in the manner that is more optimal for the customer. The customers resources may also be migrated to another location (host, data center, rack, and the like) that is more optimal. Generally, any manner of improving the provisioning for the customer may be used.

Figure 17:
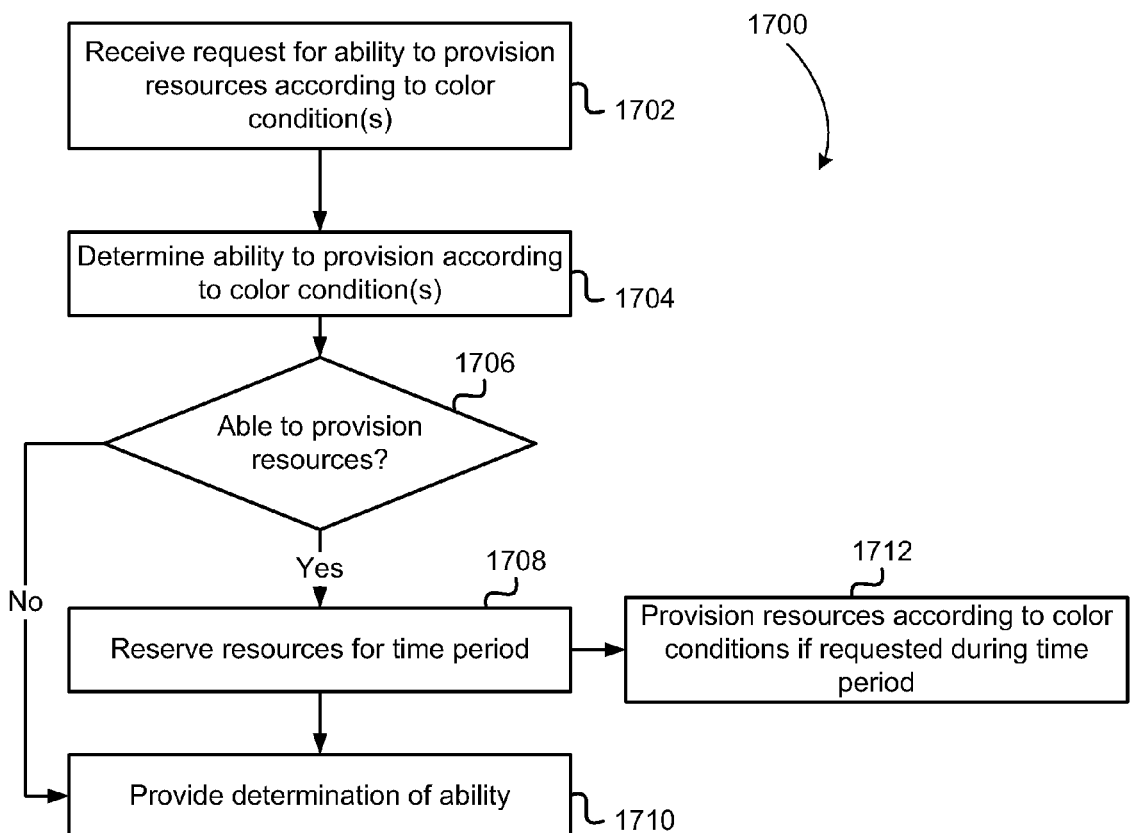
FIG. 17 is a schematic diagram depicting aspects of an example process of provisioning resources, in accordance with at least one embodiment.

In some instances, it may be desirable for customers to know before having resources provisioned how well a virtual resource provider is able to provision resources. Such information, for example, may be useful in planning the design of one's resources. FIG. 17, accordingly, provides an illustrative example of a process 1700 which may be used to provide such information and provisioned resources if applicable. In an embodiment, the process 1700 includes receiving a request for the ability to provision resources according to one or more color conditions. The customer may inquire, for example, whether it is possible to provision a certain number of virtual machine instances close to a container of resources colored "green." In an embodiment, the ability to provision according to color conditions is determined 1704. In determining whether there are available resources that satisfy the ability to provision according to color conditions may be made by determining whether there are resources available that satisfy the color conditions, such as in a manner described above.

In an embodiment, a determination is made 1706 whether it is possible to provision the requested resources according to the one or more color conditions. In instances where there are multiple customers, the availability of resources may change rapidly as customers utilize resources for their own use. Accordingly, in an embodiment, if a determination is made that it is possible to provision the resources according to the color conditions, resources are reserved 1708 for a time period. The time period may be, for example, one hour or similarly any time period if it is sufficient to provide a user enough time to decide whether to, in fact, provision the requested resources. If, however, a determination is made that it is not possible to provision the requested resources according to the one or more color conditions, then a determination of the ability is provided 1710. For example, a message may be sent to a user specifying that it is not possible to fulfill such a request. Other information may be provided, such as alternate ways in which resources may be provisioned. If the resources have been reserved because it was determined that it was possible to provision the resources, then if that provisioning is requested, the resources may be provisioned 1712 in a manner that satisfies the one or more color conditions.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIPS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for provisioning computing resources, comprising:
under the control of one or more computer systems of a multi-tenant resource provider, configured with executable instructions,
associating a color designation with at least one collection of computing resources that is hosted by the resource provider and operated under the direction of a customer of the resource provider;
receiving, in connection with a request to provision one or more computing resources, information that specifies one or more relationships with the collection of computing resources, the one or more relationships being specified with the color designation and thereby being based at least in part on one or more characteristics of the at least one collection of computing resources associated with the color designation, the information that specifies the one or more relationships including information designating a color corresponding to at least one or more computing resources of a different customer of the resource provider;
determining a set of available resources that have the specified one or more relationships with the collection of computing resources; and
using the determined set of available resources to fulfill the request.

2. The computer-implemented method of claim 1, wherein the collection of computing resources is a network of computing resources hosted by the resource provider and operated under direction of a customer of the resource provider.

3. The computer-implemented method of claim 1, wherein the information that specifies the one or more relationships includes information designating a color for the one or more requested computing resources.

4. The computer-implemented method of claim 1, wherein the one or more requested computing resources include one or more virtual machine instances.

5. A non-transitory computer-readable storage medium having stored thereon instructions that, when executed by one or more processors of a computing system, cause the computing system to at least:
- associate a color designation with at least one collection of computing resources that is hosted by the resource provider and operated under the direction of a customer of the resource provider;
- receive, in connection with a request to provision one or more computing resources, information that specifies one or more relationships with the collection of computing resources, the one or more relationships being specified with the color designation and thereby being based at least in part on one or more characteristics of the at least one collection of computing resources associated with the color designation, the information that specifies the one or more relationships including information designating a color corresponding to at least one or more computing resources of a different customer of the resource provider;
- determine a set of available resources that have the specified one or more relationships with the collection of computing resources; and
- use the determined set of available resources to fulfill the request.

6. The computer-readable storage medium of claim 5, wherein the collection of computing resources is a network of computing resources hosted by the resource provider and operated under directions of the customer of the resource provider.

7. The computer-readable storage medium of claim 5, wherein the instructions further include instructions that cause the computer system to associate another color designation with at least one other collection of computing resources that is hosted by the resource provider and wherein the one or more relationships are further based at least in part on said another color designation.

8. The computer-readable storage medium of claim 5, wherein the request to provision one or more computing resources includes one or more provisioning conditions, the one or more provisioning conditions based at least in part on a distance measurement to the collection of resources.

9. The computer-implemented method of claim 5, wherein the set of available resources used to provision the one or more resources is automatically changed and optimized over time with respect to the one or more relationships that are based at least in part on the color designation.

10. A computer-implemented method for provisioning computing resources, comprising:
- under the control of one or more computer systems of a multi-tenant virtual resource provider, configured with executable instructions,
  - receiving information specifying one or more color designations;
  - receiving a request to provision customer computing resources for a customer of the virtual resource provider, the request specifying one or more relationships with one or more collections of computing resources, the one or more relationships being specified with the one or more color designations and thereby being based at least in part on one or more characteristics of the one or more collections of computing resources associated with the one or more color designations, the request specifying the one or more relationships including information designating a color corresponding to at least one or more computing resources of a different customer of the virtual resource provider;
  - determining whether the request is able to be fulfilled according to the specified one or more relationships; and
  - provisioning the requested resources according to the specified one or more relationships when it is determined that the request is able to be fulfilled according to the specified one or more relationships.

11. The computer-implemented method of claim 10, wherein the one or more color designations corresponds to the one or more collections of computing resources that operate, at least in part, using implementation resources of the virtual resource provider, at least one of the one or more collections of computing resources is a network of computing resources hosted by the virtual resource provider and operated under direction of the customer.

12. The computer-implemented method of claim 10, wherein the request to provision customer computing resources specifies one or more proximity conditions where the one or more proximity conditions are based at least in part on one or more of the group consisting of bandwidth, latency, and a network hop count.

13. The computer-implemented method of claim 12, wherein at least one of the one or more proximity conditions are based at least in part on one or more physical locations of the one or more collections of computing resources.

14. The computer-implemented method of claim 12, wherein at least one of the one or more proximity conditions are based at least in part on one or more geopolitical characteristics of the one or more collections of computing resources.

15. The computer-implemented method of claim 12, wherein the one or more proximity conditions are specified with one or more color designations for the requested customer computing resources, the one or more color designations being of a set of available color designations that correspond with the one or more proximity conditions specified for the requested customer computing resources.

16. The computer-implemented method of claim 12, wherein at least one of the one or more proximity conditions are based at least in part on costs for transferring information between the requested resources and at least one of the one or more collections of resources.

17. The computer-implemented method of claim 12, further comprising providing, to the customer, information indicating whether the request was able to be fulfilled according to the received one or more proximity conditions.

18. The computer-implemented method of claim 12, further comprising provisioning, when determined that the request is unable to be fulfilled according to the received one or more proximity conditions, the requested resources in a manner leaving at least one of the one or more proximity conditions unfulfilled.

19. A computer-implemented method for provisioning computing resources, comprising:
- under the control of one or more computer systems of a multi-tenant resource provider, configured with executable instructions,
  - receiving information specifying one or more color designations for one or more virtual machines;
  - in response to receipt of the information specifying the one or more color designations, associating the one or more color designations with the one or more virtual machines;

receiving a request to provision one or more resources according to one or more relationships with the one or more virtual machines, the one or more relationships being specified with the one or more color designations and thereby being based at least in part on one or more characteristics of the one or more virtual machines associated with the one or more color designations, the information specifying the one or more color designations including information designating a color corresponding to at least one or more virtual machines of a different customer of the multi-tenant resource provider; and provisioning the one or more resources according to the one or more relationships.

20. The computer-implemented method of claim 19, wherein provisioning the one or more resources according to the one or more relationships includes relaxing at least one relationship of the one or more relationship until the relaxed relationship is able to be fulfilled.

21. The computer-implemented method of claim 19, wherein the one or more resources were requested by a customer of the multi-tenant resource provider.

22. The computer-implemented method of claim 19, wherein the one or more resources were requested by a customer of the multi-tenant resource provider that is different from another customer of the resource provider for whom at least one of the one or more collections is allocated.

23. The computer-implemented method of claim 19, wherein the one or more relationships includes one or more proximity conditions specified with one or more color designations, the one or more color designations being of a set of available color designations that correspond with the one or more proximity conditions.

24. The computer-implemented method of claim 23, wherein the one or more proximity conditions include a preference that the requested resources should be colocated.

25. The computer-implemented method of claim 19, wherein the one or more virtual machines are implemented at least in part by a plurality of collections of computing resources and wherein the one or more proximity conditions collectively involve the plurality of collections of computing resources.

26. A computing system for provisioning computing resources, comprising:

one or more processors; and memory including executable instructions that, when executed by the one or more processors, cause the computing system to at least:

receive information specifying one or more color designations for one or more collections of virtual networks;

in response to receipt of the information specifying the one or more color designations, associate the one or more color designations with the one or more collections of virtual networks;

receive a request to provision one or more resources according to one or more relationships with the one or more collections of virtual networks, the one or more relationships being specified with the one or more color designations and thereby being based at least in part on one or more characteristics of the one or more collections of virtual networks associated with the one or more color designations, the information specifying the one or more color designations including information designation a color corresponding to at least one or more collections of virtual networks of a different customer of a resource provider; and provision the one or more resources according to the one or more relationships.

27. The computing system of claim 26, wherein at least one of the one or more collections of virtual networks are hosted by a resource provider and operated under direction of a customer of the resource provider.

28. The computing system of claim 26, wherein the request to provision the one or more resources specifies one or more proximity conditions based at least in part on geographic characteristics.

29. The computing system of claim 26, wherein the request to provision the one or more resources specifies one or more proximity conditions based at least in part on one or more color designations.

30. The computing system of claim 26, wherein the request to provision the one or more resources specifies one or more fault boundaries based at least in part on one or more color designations.

* * * * *